United States Patent
Sauve et al.

(10) Patent No.: US 9,208,327 B2
(45) Date of Patent: *Dec. 8, 2015

(54) TIERED OBJECT-RELATED TRUST DECISIONS

(71) Applicant: Microsoft Corporation, Redmond, WA (US)

(72) Inventors: Aaron Sauve, Seattle, WA (US); Li-Hsin Huang, Bellevue, WA (US); Tony Schreiner, Redmond, WA (US); Jeffrey Davis, Redmond, WA (US); Tom Pipinich, Redmond, WA (US); Jonathan Gass, Ilford (GB); J. Craig Hally, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/901,212

(22) Filed: May 23, 2013

(65) Prior Publication Data
US 2013/0254898 A1  Sep. 26, 2013

Related U.S. Application Data

(60) Continuation of application No. 13/164,554, filed on Jun. 20, 2011, now Pat. No. 8,468,603, which is a division of application No. 10/780,144, filed on Feb. 17, 2004, now Pat. No. 8,332,943.

(51) Int. Cl.
G06F 12/14 (2006.01)
G06F 21/60 (2013.01)
G06F 21/52 (2013.01)

(52) U.S. Cl.
CPC ............. *G06F 21/60* (2013.01); *G06F 21/52* (2013.01); *G06F 2221/2113* (2013.01); *G06F 2221/2119* (2013.01)

(58) Field of Classification Search
None
See application file for complete search history.

(56) References Cited

U.S. PATENT DOCUMENTS

| | | |
|---|---|---|
| 5,675,520 A | 10/1997 | Pitt, III et al. |
| 5,958,051 A | 9/1999 | Renaud et al. |
| 6,061,695 A | 5/2000 | Slivka et al. |

(Continued)

FOREIGN PATENT DOCUMENTS

| | | |
|---|---|---|
| EP | 1376343 | 1/2004 |
| JP | 10-177466 | 6/1998 |

(Continued)

OTHER PUBLICATIONS

Chinese Decision on Reexamination mailed Dec. 26, 2011, in Application No. 200480001362.7 (6 pages).

(Continued)

*Primary Examiner* — Kaveh Abrishamkar
(74) *Attorney, Agent, or Firm* — Bryan Webster; Kate Drakos; Micky Minhas

(57) ABSTRACT

Adware and viruses are examples of objects that may be embedded in a web page or linked to a web page. When such an object is detected to be associated with a web page loading on a browser, an analysis may be performed to determine a trust level for the object. The object is suppressed based on the trust level. A prompt is displayed to advise a user that the object has been suppressed, and to provide an opportunity to interactively accept or decline activation of an action for the object.

29 Claims, 10 Drawing Sheets

(56) References Cited

U.S. PATENT DOCUMENTS

| | | | |
|---|---|---|---|
| 6,092,194 | A | 7/2000 | Touboul |
| 6,124,856 | A | 9/2000 | Bryan et al. |
| 6,154,844 | A * | 11/2000 | Touboul et al. ............... 726/24 |
| 6,167,520 | A * | 12/2000 | Touboul ........................ 726/23 |
| 6,202,202 | B1 | 3/2001 | SteensQaard |
| 6,202,207 | B1 * | 3/2001 | Donohue .................... 717/173 |
| 6,321,334 | B1 * | 11/2001 | Jerger et al. ..................... 726/1 |
| 6,324,553 | B1 | 11/2001 | Cragun et al. |
| 6,336,140 | B1 | 1/2002 | Elgressy et al. |
| 6,341,373 | B1 | 1/2002 | Shaw |
| 6,366,912 | B1 | 4/2002 | Wallent et al. |
| 6,480,962 | B1 * | 11/2002 | Touboul ........................ 726/22 |
| 6,649,714 | B2 | 11/2003 | Jayaraman et al. |
| 6,687,737 | B2 | 2/2004 | Landsman et al. |
| 6,708,276 | B1 | 3/2004 | Yarsa et al. |
| 6,804,780 | B1 * | 10/2004 | Touboul ....................... 713/181 |
| 6,833,848 | B1 | 12/2004 | Wolff et al. |
| 6,854,016 | B1 | 2/2005 | Kraenzel et al. |
| 6,928,550 | B1 | 8/2005 | Le Pennec et al. |
| 7,058,822 | B2 | 6/2006 | Edery et al. |
| 7,111,246 | B2 | 9/2006 | Sauve et al. |
| 8,332,943 | B2 | 12/2012 | Sauve et al. |
| 8,468,603 | B2 | 6/2013 | Sauve et al. |
| 2001/0056498 | A1 | 12/2001 | Kohda et al. |
| 2002/0013910 | A1 | 1/2002 | Edery et al. |
| 2002/0032869 | A1 | 3/2002 | Lamberton et al. |
| 2002/0107826 | A1 | 8/2002 | Ramachandran et al. |
| 2003/0098863 | A1 | 5/2003 | Fujita et al. |
| 2003/0098883 | A1 * | 5/2003 | Pennell et al. ............... 345/781 |
| 2004/0083474 | A1 | 4/2004 | McKinlay et al. |
| 2005/0066290 | A1 | 3/2005 | Chebolu et al. |
| 2012/0222118 | A1 | 8/2012 | Sauve et al. |

FOREIGN PATENT DOCUMENTS

| | | |
|---|---|---|
| JP | 2003-189049 | 7/2003 |
| JP | 2004-532573 | 10/2004 |
| KR | 2002-0003286 | 1/2002 |
| WO | WO 98/21683 | 5/1998 |
| WO | WO 00/63903 | 10/2000 |
| WO | WO 02/096008 | 11/2002 |

OTHER PUBLICATIONS

Chinese Decision on Rejection mailed Feb. 5, 2010, in Application No. 200480001362.7 (12 pages).
Chinese First Office Action mailed Aug. 8, 2008, in Chinese Application No. 200480001423.X (17 pgs).
Chinese First Office Action mailed Dec. 7, 2007, in Application No. 200480001362.7 (12 pages).
Chinese Notice on Grant of Patent Right for Invention mailed Mar. 20, 2009, in Chinese Application No. 200480001423.X (4 Pgs).
Chinese Response to First Office Action filed Apr. 22, 2008, in Application No. 200480001362.7 (12 pages).
Chinese Response to First Office Action mailed Dec. 11, 2008, in Chinese Application No. 200480001423.X (20 pgs).
Chinese Second Office Action mailed Aug. 8, 2008, in Application No. 200480001362.7 (10 pages).
European Communication mailed Aug. 13, 2012 in European Application No. 12000392.6 (1 page).
European Communication mailed Aug. 6, 2012, in European Application No. 04778922.7 (5 pgs).
European Communication mailed Jan. 13, 2010, in European Application No. 04778931.8 (3 pgs).
European Communication mailed May 13, 2013, in European Application No. 12000392.6, 6 pgs.
European Reply to Communication mailed Jan. 13, 2010, in European Application No. 04778931.8, filed May 25, 2010 (27 pgs).
European Search Report filed Sep. 9, 2005, in Application No. 4778922.7 (2 pages).
European Search Report mailed Jul. 10, 2012, in European Application No. 12000392.6 (9 Pgs).
European Search Report mailed Nov. 16, 2006, in European Application No. 04778931.8 (3 pgs).
European Search Report mailed Oct. 30, 2009, in European Application No. 04778931.8 (3 Pgs).
European Supplemental Search Report filed May 3, 2012, in Application No. 4778922.7 (1 page).
Gong et al., "Going Beyond the Sandbox: An Overview of the New Security Architecture in the Java Development Kit 1.2", Proceedings of the Usenix Symposium on Internet Technologies and Systems, Dec. 8-11, 1997 (10 pgs).
*Google Toolbar Options Help*, [online], Dec. 4, 2003, Retrieved from the Internet: URL:http://toolbar.google.com/popup_help.html [Retrieved on Nov. 7, 2005] (If necessary, see http://web.archive.org/web/20031204090630/http:IItoolbar.google.com/popup help.html.) (13 pgs).
*Google Toolbar Options Help*, http://toolbar.google.com/popup_help.html, version from archive.org, Dec. 4, 2003.
*Google Toolbar Options Help*, http://web.archive.org/web/20031204090630/http://toolbar.google.com/popup_help.ht.., Aug. 9, 2012 (1 page).
Indian First Examination Report, Application 1849/DELNP/2005, mailed May 16, 2013, 2 pgs.
Indian First Examination Report, Application 1854/DELNP/2005, mailed May 29, 2013, 2 pgs.
International Publication of International Search Report for WO 2005/081666 dated Nov. 16, 2006.
International Search Report filed Sep. 9, 2005 in Application No. PCT/US2004/23630 (4 pages).
International search report for PCT/US04/23639 dated Nov. 16, 2006.
Japanese Appeal Decision mailed Nov. 27, 2012, in Application No. 2006-553110 (14 pages).
Japanese Decision to Grant mailed Feb. 29, 2008, in Application No. 2006-553109 (3 pages).
Japanese Final Rejection mailed Dec. 3, 2010, in Japanese Application No. 2006-553110 (11 pgs).
Japanese Notice of Rejection mailed Jul. 20, 2010, in Japanese Application No. 2006-553110 (13 Pgs).
Japanese Notice of Rejection mailed Mar. 9, 2010, in Japanese Application No. 2006-553110 (7 Pgs).
Japanese Official Notice on Rejection mailed Aug. 24, 2007, in Application No. 2006-553109 (6 pages).
Japanese Response filed Dec. 21, 2007, in Application No. 2006-553109 (8 pages).
Japanese Response mailed Jun. 8, 2010, in Japanese Application No. 2006-553110 (11 pgs).
Japanese Response mailed Oct. 20, 2010, in Japanese Application No. 2006-553110 (26 pgs).
Japanese Written Appeal mailed Apr. 4, 2011, in Japanese Application No. 2006-553110 (6 pgs).
Korean Amendment mailed Aug. 1, 2011, in Korean Application No. 1 0/2011-7005963 (27 PQs).
Korean Amendment mailed Mar. 14, 2011, in Korean Application No. 1 0/2005-7007940 (17 PQs).
Korean Certificate of Patents Granted mailed Jun. 11, 2012, in Application No. 10-2011-7005963 (10 pages).
Korean Notice of Allowed Claims mailed Jul. 30, 2011, in Korean Application No. 2005-7007940 (6 pgs).
Kurokawa, Kaeru. Emergency Alert! Arm with an IDS & a Fire Wall!, PC Japan, vol. 8, No. 10, Japan, Softbank Publishing Corp., Oct. 1, 2003, vol. 8, pp. 80 to 85 (domestic technical journal 2004-01062-005).
Shoji Oakada, "Part 2 Focus attention on extra functions other than retrieval! Detailed explanation! Five items selected by editors," *Windows Server World*, vol. 8, No. 12, p. 116, IDG Japan, Inc., Dec. 1, 2003 (2 pgs).
Sonoda, Michio. "Basics of Windows security, 1 Risk of ActiveX controls and scripting, Vulnerable standard features of IE, Restrict conditions for execution and retain security," *Nikkei Windows* Pro, No. 73, pp. 98-102, Nikkei Business Publications, Inc., Apr. 1, 2003 (6 pgs).
United States Non-Final Office Action mailed Nov. 14, 2005, in U.S. Appl. No. 10/779,925 (10 pgs).

(56) References Cited

OTHER PUBLICATIONS

United States Notice of Allowance mailed Aug. 1, 2012, in U.S. Appl. No. 10/780,144 (6 pgs).
United States Notice of Allowance mailed Feb. 13, 2006, in U.S. Appl. No. 10/779,925 (8 pgs).
United States Response to Non-Final Office Action mailed Nov. 14, 2005, in U.S. Appl. No. 10/779,925, filed Jan. 25, 2006 (10 pgs).
United States Supplemental Response to Non-Final Office Action mailed Nov. 14, 2005, in U.S. Appl. No. 10/779,925, filed Jan. 31, 2006 (7 pgs).
US Advisory Action mailed Jan. 8, 2009, in U.S. Appl. No. 10/780,144 (3 pages).
US Amendment and Response filed Jul. 22, 2013, in U.S. Appl. No. 13/464,744 (14 pages).
US Amendment filed Nov. 13, 2012, in U.S. Appl. No. 13/164,554 (14 pages).
US Final Office Action mailed Mar. 7, 2007, in U.S. Appl. No. 10/780,144 (16 pages).
US Final Office Action mailed Aug. 9, 2011, in U.S. Appl. No. 10/780,144 (25 pages).
US Final Office Action mailed Sep 5, 2008, in U.S. Appl. No. 10/780,144 (19 pages).
US Final Office Action mailed Nov. 10, 2009, in U.S. Appl. No. 10/780,144 (19 pages).
US Non-Final Office Action mailed Mar. 21, 2013, in U.S. Appl. No. 13/464,744 (16 pages).
US Non-Final Office Action mailed Apr. 10, 2009, in U.S. Appl. No. 10/780,144 (6 pages).
US Non-Final Office Action mailed Jun. 13, 2012, in U.S. Appl. No. 13/164,554 (7 pages).
US Non-Final Office Action mailed Aug. 22, 2006, in U.S. Appl. No. 10/780,144 (16 pages).
US Non-Final Office Action mailed Sep. 14, 2010, in U.S. Appl. No. 10/780,144 (24 pages).
US Non-Final Office Action mailed Oct. 1, 2007, in U.S. Appl. No. 10/780,144 (16 pages).
US Notice of Allowance mailed Jan. 18, 2012, in U.S. Appl. No. 10/780,144 (7 pages).
US Notice of Allowance mailed Feb. 14, 2013, in U.S. Appl. No. 13/164,554 (8 pages).
US Notice of Allowance mailed May 31, 2012, in U.S. Appl. No. 10/780,144 (5 pages).
US Response filed Jan. 16, 2007, in U.S. Appl. No. 10/780,144 (17 pages).
US Response filed Jan. 22, 2010, in U.S. Appl. No. 10/780,144 (20 pages).
US Response filed Mar. 26, 2008, in U.S. Appl. No. 10/780,144 (19 pages).
US Response filed May 31, 2011, in U.S. Appl. No. 10/780,144 (21 pages).
US Response filed Jul. 9, 2009, in U.S. Appl. No. 10/780,144 (17 pages).
US Response filed Aug. 7, 2007, in U.S. Appl. No. 10/780,144 (17 pages).
US Response filed Dec. 9, 2011, in U.S. Appl. No. 10/780,144 (19 pages).
US Response filed Dec. 14, 2010, in U.S. Appl. No. 10/780,144 (22 pages).
US Response filed Dec. 22, 2008, in U.S. Appl. No. 10/780,144 (20 pages).
"Active X", Nikkei Byte magazine, p. 264, left column, lines 1 to 13, 11-8, 1997,6 pgs. (no English translation).
Mechanism in Which IE Uses Active X, Nikkei Byte magazine, p. 104, upper column, title to right column, line 9, Oct. 2002, 17 pgs. (no English translation).
U.S. Appl. No. 13/464,744, Amendment and Response filed Sep. 10, 2014, 10 pages.
U.S. Appl. No. 13/464,744, Notice of Allowance mailed Sep. 18, 2014, 5 pages.
US Final Office Action mailed Sep. 24, 2013, in U.S. Appl. No. 13/464,744, 17 pages.
China Application 201210092855.2, Notice on the First Office Action mailed Apr. 8, 2014, 13 pages.
Europe Application 12000392.6, Communication mailed May 13, 2013, 6 pages.
Europe Application 04778922.7, Communication mailed Jun. 26, 2014, 5 pages.
India Application 1849/DELNP/2005, Second Examination Report mailed Feb. 28, 2014, 2 pages.
Japan Application 2006-553110, Appeal Decision to Grant a Patent mailed Feb. 4, 2014, 4 pages.
U.S. Appl. No. 13/464,744, Amendment and Response filed May 20, 2014, 14 pages.
U.S. Appl. No. 13/464,744, Final Rejection mailed Jun. 10, 2014, 7 pages.
European Application 04778931.8, Summons to Attend Oral Proceedings mailed Feb. 24, 2014, 8 pages.
U.S. Appl. No. 13/464,744, Amendment and Response mailed Jan. 23, 2014, 15 pages.
U.S. Appl. No. 13/464,744, Non-Final Office Action mailed Feb. 20, 2014, 20 pages.
European Application 04778931.8, Decision of the Examining Division mailed Oct. 23, 2014, 37 pages.
India Application 1849/DELNP/2005, Hearing Summons dated Nov. 28, 2014, 1 page.
China Application 201210092855.2, Notice on the Second Office Action mailed Dec. 15, 2014, 3 pages.
U.S. Appl. No. 13/464,744, Amendment filed Dec. 18, 2014, 3 pages.
U.S. Appl. No. 13/464,744, Response to Dec. 18, 2014 Amendment by Examiner, mailed Jan. 15, 2015, 3 pages.
European Application 15164080.2, Search Report mailed Jul. 30, 2015, 6 pages.
Chinese Application 201210092855.2, Third Office Action mailed Aug. 17, 2015, 11 pages.

\* cited by examiner

TIERED OBJECT-RELATED TRUST DECISIONS

CROSS REFERENCE TO RELATED APPLICATIONS

This application is a continuation of U.S. Utility patent application Ser. No. 13/164,554 filed Jun. 20, 2011, now U.S. Pat. No. 8,468,603, which is a divisional of U.S. Utility patent application Ser. No. 10/780,144 filed Feb. 17, 2004, now U.S. Pat. No. 8,332,943, which is related to U.S. Utility patent application Ser. No. 10/779,925 filed Feb. 17, 2004, now U.S. Pat. No. 7,111,246, which are hereby incorporated herein by reference in their entirety.

FIELD

The present invention is directed towards techniques for implementing a trust analysis for activatable objects associated with a web page.

BACKGROUND

The quality of a browsing experience on the internet or on an intranet is often placed at the mercy of webmasters, web administrators, and others capable of coding websites. That is, such persons are able to associate an object with a web page so that an action for the object is activated as the web page loads on a browser for the internet or an intranet. Such objects may be embedded in the code for the web page or they may be linked to the web page. Examples of such objects include advertising software ("adware") and virus programs ("viruses"). Objects for adware and viruses may include downloadable code, links, URLs, popup windows, and data files (e.g., graphic, video, audio, and/or text). Activation of an action for such objects often exposes a user's computing device to rogue software that is harmful, unwanted, unnecessary, and/or unseen.

As mentioned above, an action for such an object may be activated automatically as an internet or intranet browser loads a web page to which the object is associated. Alternatively, as the browser loads the web page, the browser may display a modal dialog so that a user may accept or decline an opportunity to activate the action. The intent behind the web site that is responsible for activating the object may be to obscure the impact of accepting the action in order to dupe the user into activating the action by hiding or eliminating an option to decline the activation opportunity. A further intent may be to have the user accept the activation opportunity by re-displaying the modal dialog after each attempt by the user to decline the activation opportunity. In either case, the user may accept the activation opportunity either inadvertently or intentionally, due to frustration as the user futilely attempts to dismiss the modal dialog from the browser.

SUMMARY

Object-related trust decisions are described herein.

Objects relating to adware or viruses may be embedded in a web page or linked to a web page. Such objects may also be embedded or linked to a multimedia document. Regardless, when such an object is detected to be associated with a web page or multimedia document loading on a browser, an analysis may be performed to determine a source of the object and an action corresponding to the object. The object and/or action may be suppressed based on whether the source of the object corresponds to a previously blocked certificate. A prompt may be displayed to advise a user that the object and/or action are being suppressed, and to provide an opportunity to interactively accept or decline activation of the action for the object.

BRIEF DESCRIPTION OF THE DRAWINGS

In the detailed description that follows, embodiments are described as illustrations only since various changes and modifications will become apparent to those skilled in the art from the following detailed description. In the drawings, the left-most digit of a reference number identifies the figure in which the reference number first appears. The use of the same reference numbers in different figures indicates similar or identical items.

DETAILED DESCRIPTION

The following description is directed to techniques for assessing a level of trust for an object and/or action associated with the object, when such an object is detected to be embedded, linked to, or otherwise associated with a web page. The description further relates to a user interface having a modeless prompt to advise a user that an object-related action is being suppressed, and to further provide the user with an interactive opportunity to accept or decline activation of the suppressed object-related action based on the trust level for the object.

Figure 1:
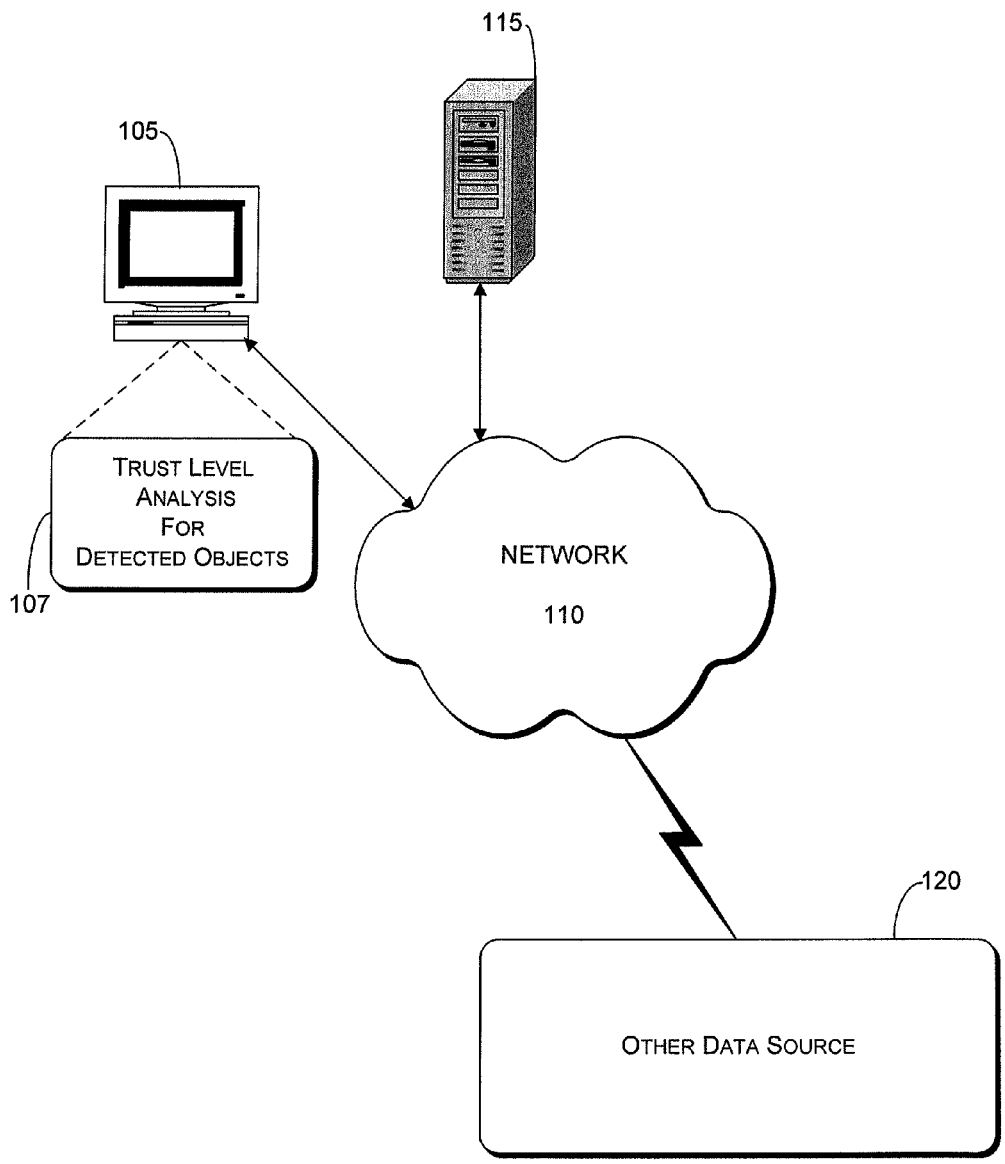
FIG. 1 shows a computing device, in a network environment, for implementing object-related trust decisions in accordance with example embodiments described herein.

FIG. 1 shows an example of computing device 105 having a trust level analysis component 107 to perform a trust level analysis for a detected object. The detected object is associated with a web page received over network 110, from source 115 or 120.

Computing device 105 may be any of a variety of conventional computing devices such as a desktop personal computer (PC). Alternatively, computing device 105 may be a network-associated device such as, but not limited to, a personal digital assistant (PDA), laptop computer, smartphone, etc., which may be in communication with a network 110 by a wired and/or wireless link. An example embodiment of a client device 105 is described in further detail below with reference to FIG. 10.

Either of data sources 115 and 120 may be a server device that provides any of a variety of data and/or functionality to computing device 105. Data sources 115 and 120 may be a server device such as a network server or an application server. A network server is a server device that delivers content to computing device 105 by way of network 110. Such content may include web content coded in hypertext markup language (HTML), which may also contain JavaScript code or other commands. It is to be appreciated that either of data sources 115 and 120 may be used in other networks that are part of The World Wide Web (e.g., where the network 110 includes The Internet), as well as in other networks that are not part of the World Wide Web, such as an intranet.

Figure 2:
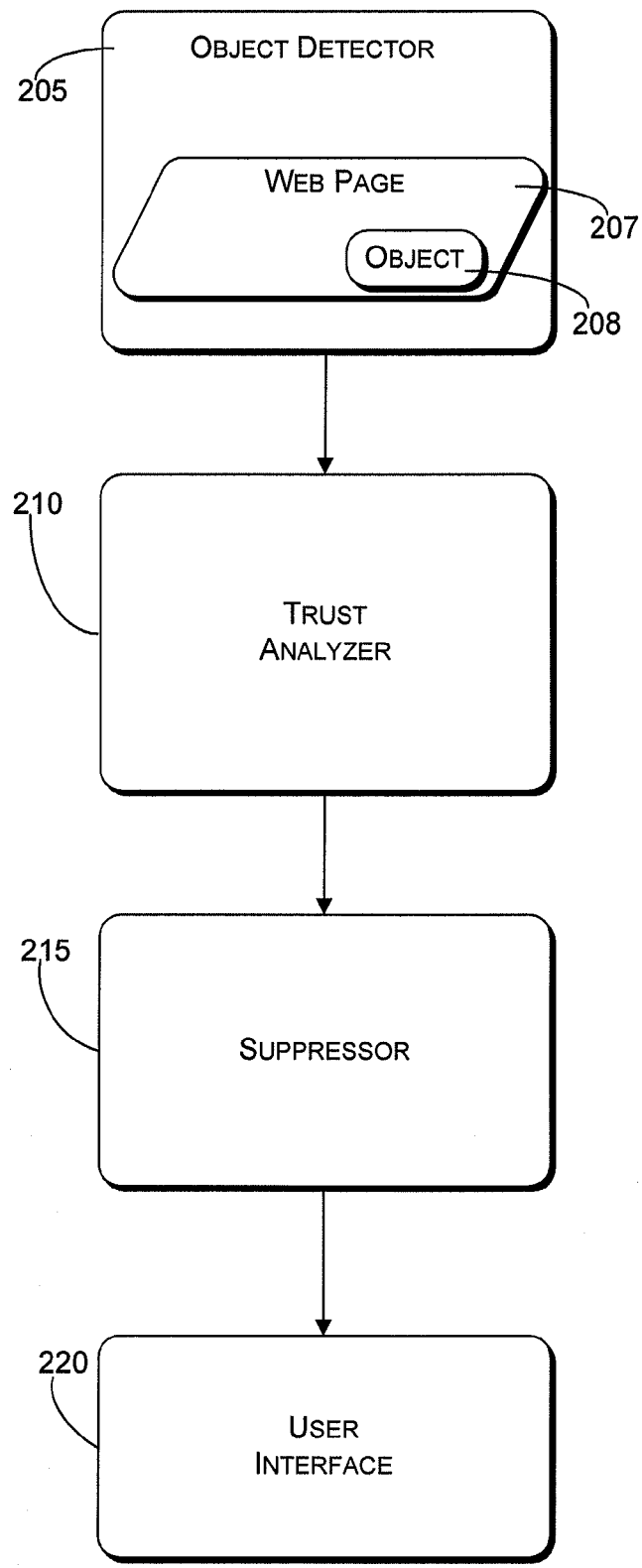
FIG. 2 illustrates examples of functional components that implement the object-related trust decisions.

FIG. 2 shows functional components of an embodiment to perform a trust level analysis for an object detected to be associated with a web page. The example of FIG. 2 is described with reference to the example of FIG. 1, in which a trust level analysis 107 is performed on computing device 105 for a detected object associated with a web page received over network 110, from source 115 or 120.

According to the example of FIG. 2, when web page 207 is loaded onto a browser of computing device 105, object detector 205 is able to detect object 208 that is embedded in, linked to, or otherwise associated with web page 207. Examples of object 208 include adware and viruses, either of which may be exposed to computing device 105 as downloadable code, a link, a URL, a popup window, and a data file. Object detector 205 may be a module on the browser or in the operating system of computing device 105. Detection of the object is made before an action associated with the object is activated, and may include detecting an attempt to, for example, load code, open an HTML document, and access and/or open a data file.

Trust analyzer 210 assesses a level of trust to be accorded to detected object 208 based on at least one of the content, source, or action associated with object 208. The level of trust accorded to object 208 influences whether the action for the object may be activated unimpeded, whether the action is suppressed while the user is provided an opportunity to interactively accept or decline activation of an action for the object, or whether the action for the object is blocked altogether. It is to be appreciated that other levels of trust and their consequences may be apparent to those skilled in the art, and further that the examples provided herein are not to be considered to be limiting.

Objects assessed to have a level of explicit trustworthiness may have their associated actions activated without impedance. All other objects have their associated actions suppressed by suppressor 215. User interface 220 is provided to advise a user of the suppression of an action for an object, and to further provide an opportunity for the user to interactively accept or decline activation of the action for the object.

Figure 3:
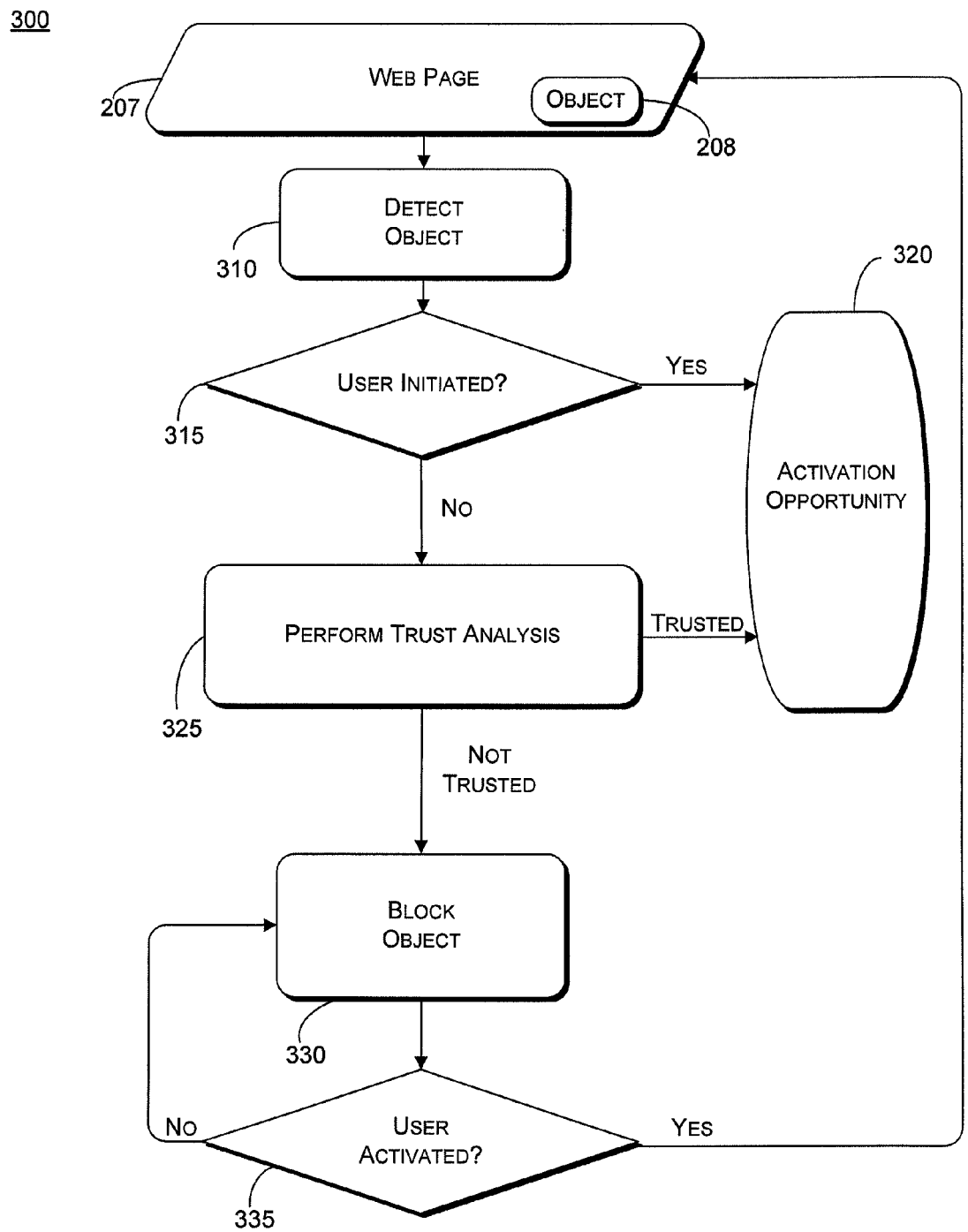
FIG. 3 illustrates an example of a processing flow involving the components of FIG. 2.

FIG. 3 provides a processing overview of an example embodiment. The example of FIG. 3 is explained with reference to the example embodiments of FIGS. 1 and 2 described above.

With regard to FIG. 3, as web page 207 loads on a browser for the internet or for an intranet on computing device 105, object 208 is detected 310 to be associated with web page 207. The detection 310 of object 208 includes assessing the code of object 208 to determine at least one of the content, source, and action of the object 208. It should be noted that the embodiments described herein are by no means limited to browsers for the Internet or for an intranet. For instance, any reader or player of multimedia documents may be incorporated therein. However, the example embodiments are described with regard to Internet and intranet browsers, with the understanding that such examples are not limiting.

A further determination 315 may optionally be made as to whether or not an action for object 208 has been initiated by a user. That is, the browser settings may be assessed to determine whether the action for object 208 was previously requested or otherwise initiated by a user of computing device 105, either prior to or during the loading of web page 207 on the browser. For instance, object 208 may be detected to include a file to upgrade an existing program on computing device 105 if a certificate corresponding to object 208 is deemed to be the same as that for the existing program on computing device 105.

Activation opportunity 320 may include automatically activating an action for object 208. Alternative embodiments may display a modal prompt to provide a user with an opportunity to interactively accept or decline activation of the action for object 208, or display a modeless prompt to advise the user of the impending action. Security settings and/or browser settings for computing device 105 may be configured to accommodate any of the above options for activation opportunity 320.

In the present example of FIG. 3, when the action of object 208 has been determined 315 to be user initiated, the action may be activated automatically. However, in view of the increasing abundance of rogue software circulated among network 110, an extra measure of caution may be taken by displaying a prompt to advise the user of the impending activation of the action for object 208 and/or to provide the user with one last opportunity to cancel such activation. The prompt may be either a modal prompt or a modeless prompt.

A modal prompt requests that a user interactively accept or decline activation of the action for object 208. On the other hand, a modeless prompt merely advises the user of the action, thus reducing a possibility that the user would inadvertently activate the action. While the modeless prompt does not provide a user with an opportunity to interactively accept or decline activation of the action for object 208, the modeless prompt may display a description for object 208, which facilitates a further opportunity for the user to interactively accept or decline activation of the action. Details of such a modeless prompt are provided further below with regard to FIGS. 8A, 8B, and 9.

A trust analysis is performed 325 on an action for an object 208 that is optionally determined 315 to not be user-initiated. As set forth above with regard to FIG. 2, a level of trust is accorded to detected object 208 based on, for example, at least one of the content, source, and action associated with object 208, when the security settings of the browser have been assessed. Thus, the levels of trust may be considered to be tiered. That is, more than being determined to be merely trusted or untrusted, object 208 may be accorded a variable level of trust in accordance with the content, source, and action corresponding to object 208. The level of trust for object 208 influences which option within activation opportunity 320 may be implemented for the action of object 208. Trust analysis 325 will be described in further detail with reference to the examples of FIGS. 4-7.

When object 208 is not accorded at least a threshold level of trust based on variable combinations of the content, source, and action thereof, the object is blocked 330. When an object is blocked, the action for the object is suppressed. Thus, any attempt to load code, open an HTML document, and access and/or open a data file, is unsuccessful without a user interactively accepting an opportunity to unblock the object.

For an object 208 having its action blocked, further cautionary measures may be taken to prevent computing device 105 from being exposed to software that is harmful, unwanted and/or unnecessary. Accordingly, either one of a modal prompt or a modeless prompt may again be displayed in response to object 208 being blocked, or the action for object 208 may be deprived of any activation opportunity altogether. As set forth above, a modal prompt provides the user with an opportunity to interactively override the action for object 208 being blocked. A modeless prompt advises the user that the action for object 208 has been blocked, but may further present an opportunity for the user to interactively accept activation of the action for object 208.

When object 208 and/or an associated action are blocked 330 and either a modal prompt or a modeless prompt are displayed, the user receives a further opportunity to activate the action for object 208. A modal prompt typically includes an option for the user to "accept" or "decline" activation of the action for object 208. A modeless prompt displays an advisory indicating that the action for object is blocked, but also provides an opportunity for the user to investigate details of object 208 and the blocked action, which may lead to a further opportunity to interactively accept or decline activation of the action. Details of an example of a modeless prompt are provided below with regard to FIGS. 8A, 8B, and 9.

When the user interactively accepts an opportunity to activate the action for object 208, web page 207 typically reloads (i.e., refreshes) in order for the action to be activated. On the other hand, when the user interactively declines activation of the action for object 208, the object may be blocked 330 by either deleting the object 208 from computing device 105 altogether or displaying yet another prompt for the user.

Figure 4:
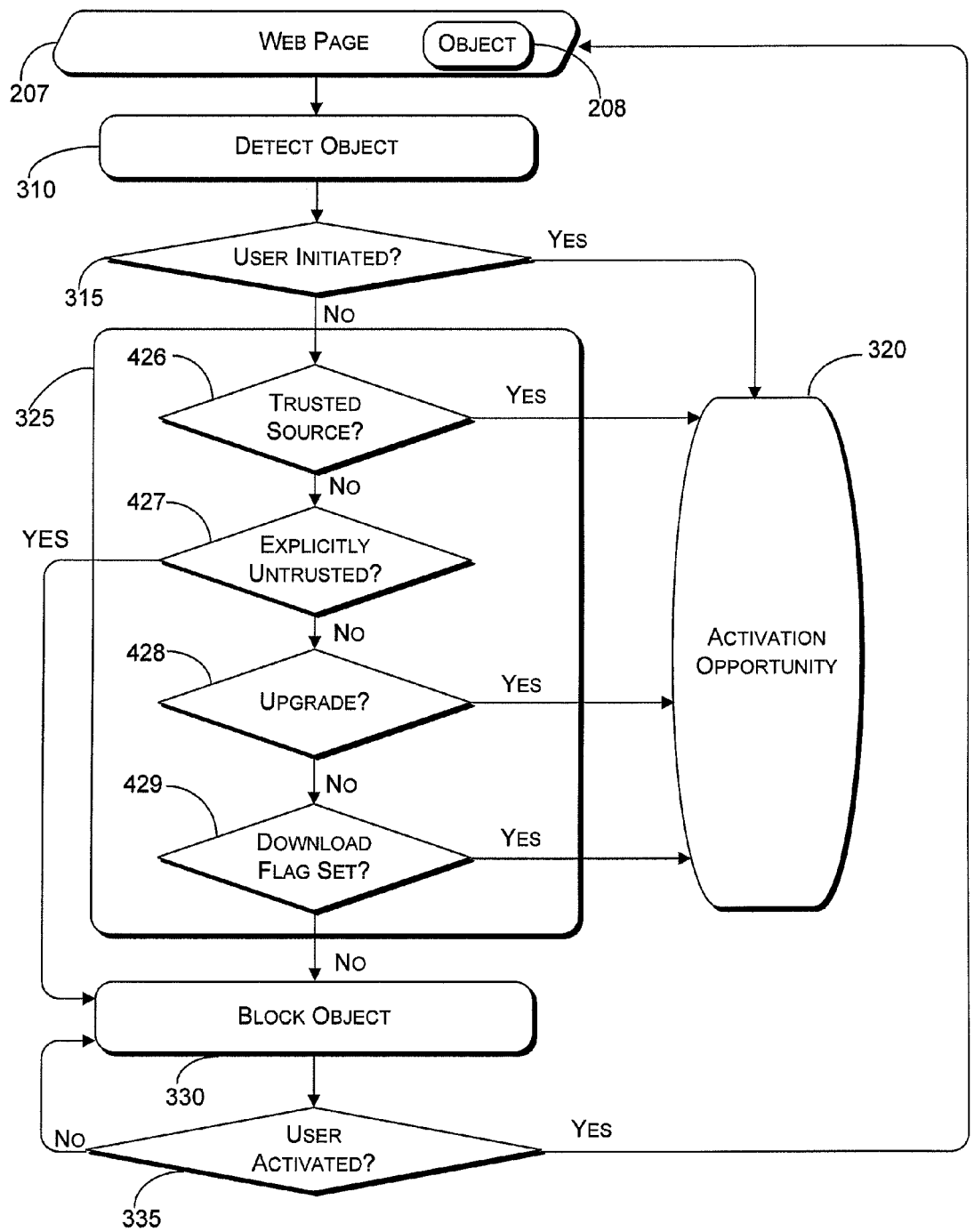
FIG. 4 illustrates a processing flow further to the example of FIG. 3.
Figure 5:
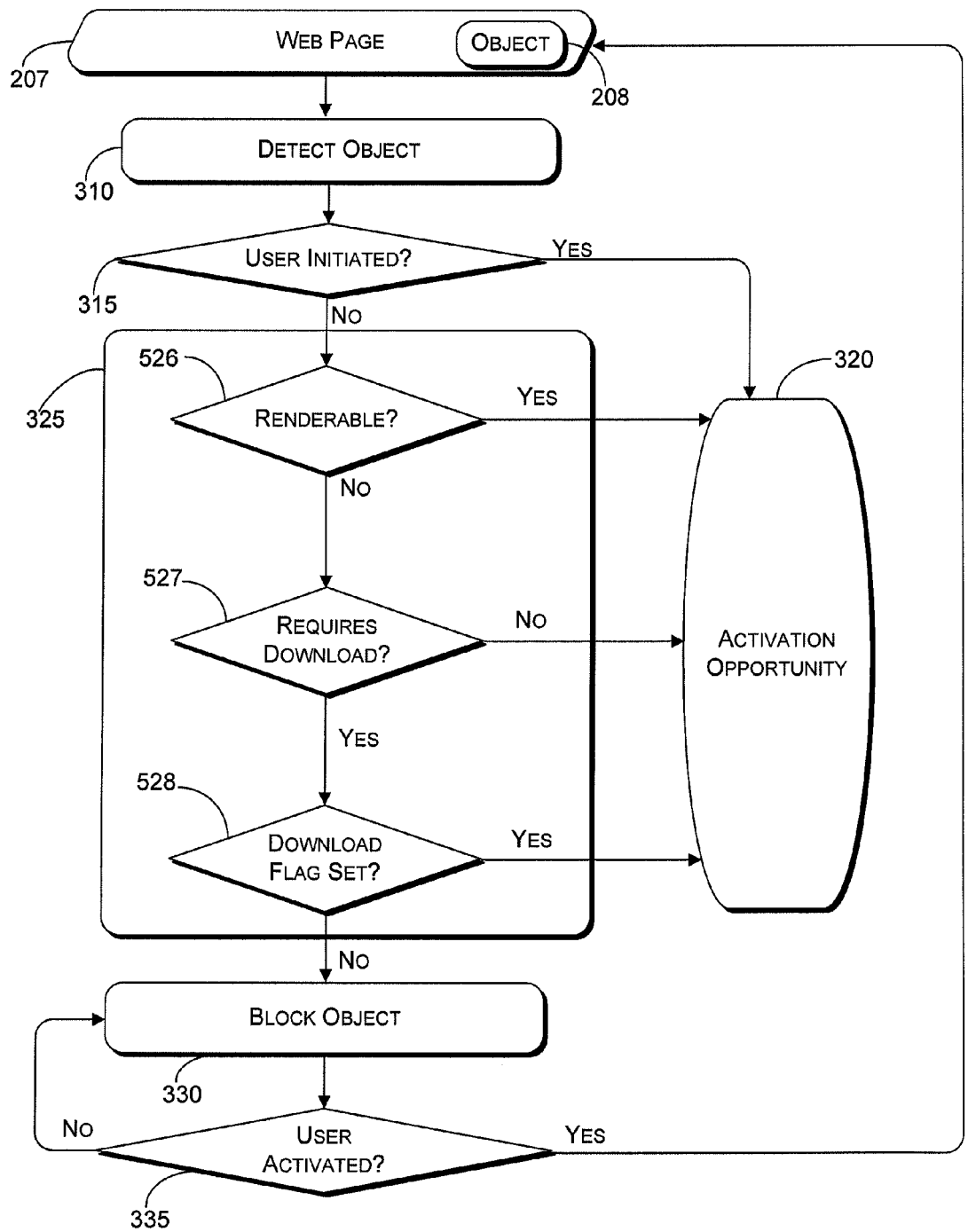
FIG. 5 illustrates another processing flow further to the example of FIG. 3.
Figure 6:
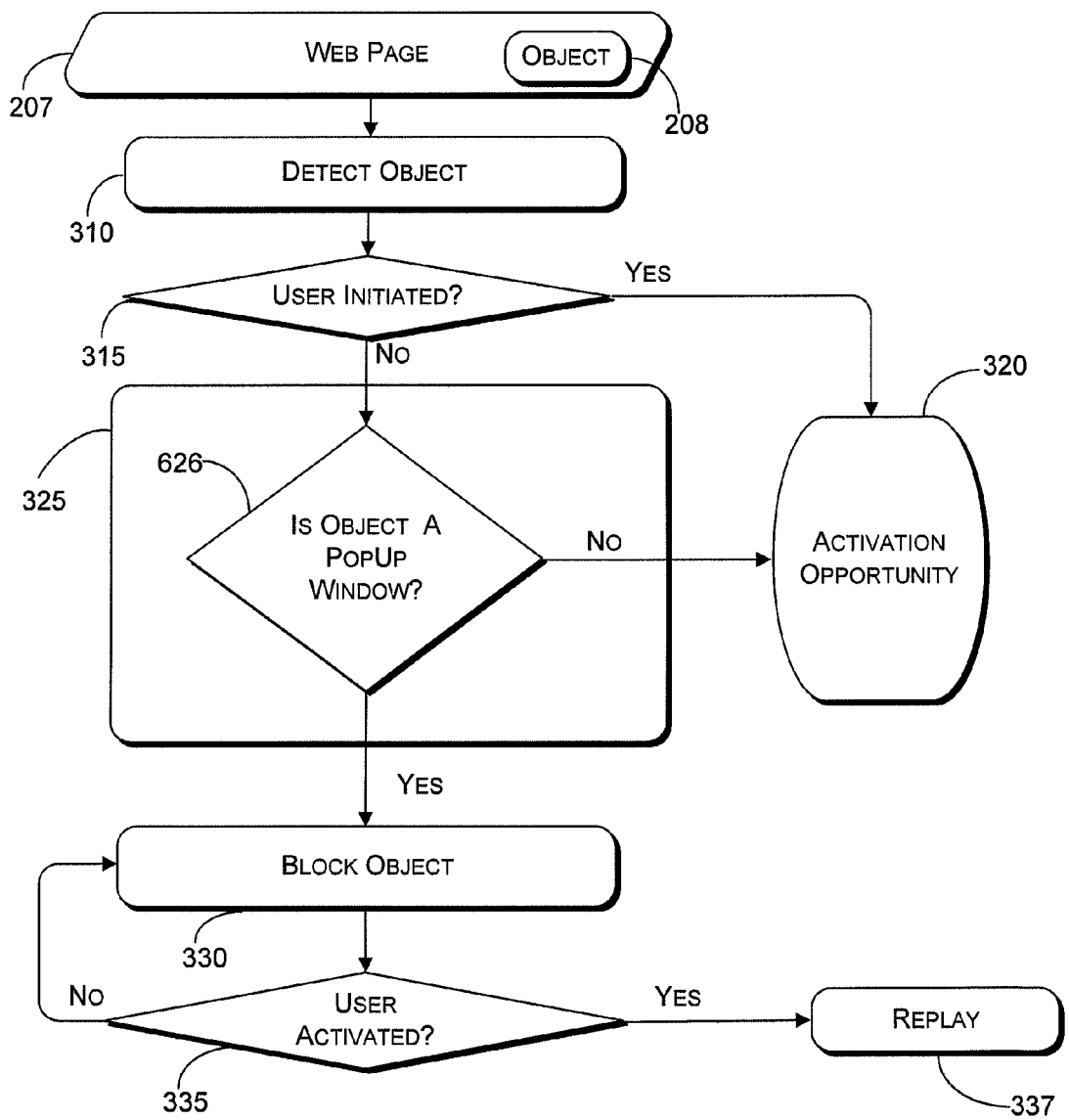
FIG. 6 illustrates another processing flow further to the example of FIG. 3.

FIGS. 4-7 are provided to illustrate embodiments further to the example of FIG. 3. More specifically, FIGS. 4-7 provide details pertaining to the trust level analysis 325 performed by analyzer 210 in FIG. 3 to assess which of the tiered trust levels may be accorded to object 208. FIG. 4 describes an example in which a trust level analysis is performed on a non-user activated code download on the browser; FIG. 5 describes an example in which a trust level analysis is performed on a code download that may or may not be safely performed on the browser; FIG. 6 describes an example in which a trust level analysis is performed on a popup window; and FIG. 7 describes an example in which a trust level analysis is performed on a navigation object that may or may not exceed the security settings of computing device 105.

FIGS. 4-7 differ from FIG. 3 primarily with regard to the performance of trust analysis 325. Thus, the following descriptions of FIGS. 4-7 are provided with an emphasis on the performance of trust analysis 325. Any further variations in FIGS. 4-7 from the description of FIG. 3 will be described.

FIG. 4 describes an example in which a trust level analysis is performed on a non-user activated code download on the browser. More particularly, as web page 207 loads on a browser for computing device 105, object 208 is detected 310 to be associated with web page 207. According to the present embodiment, based on an assessment of the code for object 208, object 208 is determined to be a software module that enables functionality by calling ready-made components that blend in and appear as part of the code for web page 207. A non-limiting example of such code found in object 208 is an ActiveX control, which is based on the Component Object Model (COM) architecture developed by the Microsoft Corporation. On the internet or on an intranet, an ActiveX control may be linked to web page 207 and downloaded by a compliant browser, and may be activated as any other executable program.

A determination 315 is made as to whether or not an action for object 208 has been initiated by a user. If so, activation opportunity 320 may include automatically activating an action for object 208. Alternative embodiments may display a modal prompt to provide a user with an opportunity to interactively accept or decline activation of the action for object 208, or display a modeless prompt to advise the user of the impending action.

The trust level analysis 325 for a non-user activated code download determines whether the source of object 208 is trusted. A source may be determined to be trusted if content from the source already exists on computing device 105, or if other security settings of computing device 105 have otherwise indicated that the content from the source of object 208 is acceptable on computing device 105.

A positive trust assessment 426 for object 208 results in activation opportunity 320 for the action of object 208. For trusted object 208, activation opportunity 320 may include automatic activation of the action for object 208. Alternatively, as a cautionary measure, activation opportunity 320 may include either of a modal prompt or modeless prompt, as described above with regard to FIG. 3. Security settings and/or browser settings for computing device 105 may be configured to accommodate any option for activation opportunity 320.

If the source of object 208 is determined 426 to not be trusted, an assessment is made of the browser's settings to determine whether the source of object 208 is explicitly untrusted. If object 208 is determined 427 to originate from an explicitly untrusted source, the action for object 208 is blocked 330. An example of an explicitly untrusted source is an originating source for a previously detected virus, which may then be stored in the security settings for the browser. Alternatively, a source may be deemed to be explicitly untrusted if no certificate exists on the downloaded code, if the user has previously chosen to not trust the publisher referenced by the certificate, or depending upon the security settings of the browser.

According to the example embodiments described herein, when an object is blocked 330, the action for object 208 is suppressed. The browser then displays a modeless prompt to inform the user that the action for object 208 has been suppressed. Continued interaction with the modeless prompt by the user may result in an opportunity for the user to gather details for object 208 and the suppressed action, which may lead to a further opportunity to interactively accept or decline activation of the action for object 208. However, for untrusted object 208, a further alternative may include object 208 being deleted from computing device 105 altogether, without providing a user the opportunity to expose computing device 105 to content from an untrusted source.

If the source of object 208 is not determined 427 to be explicitly untrusted, a determination 428 is made as to whether object 208 contains an upgrade for an object or program that already exists on computing device 105. If an assessment of the browser and program settings of computing device 105 determines 428 that object 208 upgrades an existing object or program, activation opportunity 320 is provided for the action of object 208. Activation opportunity 320 may include either of a modal prompt or modeless prompt being displayed for the user, as described above with regard to FIG. 3. Security settings and/or browser settings for computing device 105 may be configured to accommodate any option for activation opportunity 320.

If an assessment of the browser settings, program settings, or security settings on computing device 105 determines 428 that object 208 does not upgrade an object or program already existing on computing device 105, a determination 429 is made as to whether a flag is set on computing device 105. For example, a download flag may be set for any of the browser settings, program settings, or security settings on computing device 105. A download flag may pertain to downloads from particular sources or for particular content, for example.

If an assessment of settings for either the browser or computing device 105 determines 429 that a flag is set, activation opportunity 320 is provided for the action of object 208, thus displaying either of a modal prompt or modeless prompt for the user, as described above with regard to FIG. 3.

If an assessment of the browser and settings of computing device 105 determines 429 that a download flag is not set, object 208 is blocked 330 and the action for object 208 is suppressed. The browser then displays a modeless prompt to inform the user that the action for object 208 has been suppressed. Continued interaction with the modeless prompt by the user may result in an opportunity for the user to investigate details pertaining to object 208 and the suppressed action, which may lead to a further opportunity to interactively accept or decline activation of the action for object 208.

If the user does interactively accept 335 the opportunity to activate the action for object 208, web page 207 is reloaded, or refreshed, thus activating the action for object 208. However, if the user interactively declines the opportunity activate the action for object 208, object 208 remains blocked. It is to be appreciated that when object 208 is blocked 330, the user's browsing experience on web page 207 continues, but without being exposed to the content of object 208.

FIG. 5 describes an example in which a trust level analysis is performed on content that may not be safely shown inside the browser. More particularly, as web page 207 loads on a browser for computing device 105, object 208 is detected 310 to be associated with web page 207. According to the present embodiment, based on an assessment of the code for object 208, object 208 is determined to be a content type that is not hostable by the browser of computing device 105. That is, the content or data associated with object 208 is not a type such as HTML, XML, or plain text that can be directly handled by the browser, and is not a type that can be displayed with the help of browser add-ons such as those included with Adobe Acrobat® or Microsoft Office®, and therefore would require either launching an application outside the browser or the execution of the file itself.

A determination 315 is made as to whether or not the loading of object 208 on the browser of computing device 105 has been initiated by a user. If so, activation opportunity 320 may include automatically loading object 208 on the browser. Alternative embodiments may display a modal prompt to provide a user with an opportunity to interactively accept or decline activation of the action for object 208, or display a modeless prompt to advise the user of the impending action.

Trust analysis 325 is performed on the content for object 208 that is determined 315 to not be user-initiated. According to the present embodiment, based on an assessment of the code for object 208, a determination 526 is made as to whether the content of object 208 may be rendered on the browser of computing device 105 based on the perceived safety of the content type. A positive determination 526 for object 208 results in activation opportunity 320 for object 208. For trusted object 208, activation opportunity 320 may include automatically rendering the content of object 208. Alternatively, activation opportunity 320 may include either of a modal prompt or modeless prompt, as described above with regard to FIG. 3. Security settings and/or browser settings for computing device 105 may be configured to accommodate any option for activation opportunity 320.

If the content of object 208 is determined 526 to not be renderable, a determination 527 is made as to whether the content of object 208 requires downloading. If it is determined 527 that the content of object 208 does not require downloading, activation opportunity 320 is provided for object 208. Activation opportunity 320 may include automatically rendering the content of object 208 on the browser. Alternatively, a modal prompt may be displayed to provide a user with an opportunity to interactively accept or decline the rendering of object 208, or a modeless prompt may be displayed to advise the user of the rendering opportunity for object 208.

If it is determined 527 that the content of object 208 does require safety, a determination 528 is made as to whether a flag is set on computing device 105. For example, a download flag may be set any of the browser settings, program settings, or security settings on computing device 105. Further to the example, a flag indicating that the user temporarily grants at least partial trust may pertain to downloads from particular sources or for particular content, for example. If an assessment of the browser settings, program settings, or security settings on computing device 105 determines 528 that a download flag is set, activation opportunity 320 is provided to render the content of object 208, and therefore either a modal prompt or modeless prompt is displayed by the browser.

If an assessment of the browser and settings of computing device 105 determines 528 that a download flag is not set, object 208 is blocked 330 and the rendering thereof is suppressed. The browser then displays a modeless prompt to inform the user that the rendering of object 208 has been suppressed. Continued interaction with the modeless prompt by the user may result in an opportunity for the user to investigate details pertaining to object 208 and the suppressed action, which may lead to a further opportunity to interactively accept or decline rendering of object 208.

If the user does interactively accept 335 the opportunity to render object 208, web page 207 is reloaded, or refreshed, thus rendering object 208. However, if the user interactively declines the opportunity to render object 208, object 208 remains blocked. The user's browsing experience on web page 207 continues, but without the rendering of object 208.

FIG. 6 describes an example in which a trust level analysis is performed on a popup window. A popup window is an overlapped window typically used for dialog boxes, message boxes, and other temporary windows that appear separate from a main window of web page 207. It is to be appreciated that the logic for determining whether object 208 is a popup window may be adjusted to include or exclude particular objects, such as alert, confirmations, etc.

A determination 315 is made as to whether or not object 208 has been initiated by a user. If so, activation opportunity 320 may include automatically displaying the popup window of object 208 on the browser. Alternative embodiments may display a modal prompt to provide a user with an opportunity to interactively accept or decline the display of the popup window of object 208, or display a modeless prompt to advise the user of the impending display.

For the example embodiment of FIG. 6, trust analysis 325 may optionally be performed on the content of object 208 that is determined 315 to not be user-initiated because such analysis may be redundant for content that is determined to include a popup window. Regardless, if an optional determination 626 is made that the content of object 208 does not include a popup window based, for example, on a further assessment of the code of object 208, activation opportunity 320 is provided for object 208.

However, if an assessment of object 208 confirms that the content thereof is a popup window, object 208 is blocked 330 and the display thereof is suppressed. The browser then displays a modeless prompt to inform the user that the display of object 208 has been suppressed. Continued interaction with the modeless prompt by the user may result in an opportunity for the user to gather details of object 208 and the suppressed action, which may lead to a further opportunity to interactively accept or decline rendering of object 208.

If the user does interactively accept 335 the opportunity to render object 208, the popup window is replayed 337. However, if the user interactively declines the opportunity to display the popup window of object 208, object 208 remains blocked. The user's browsing experience on web page 207 continues unchanged.

Figure 7:
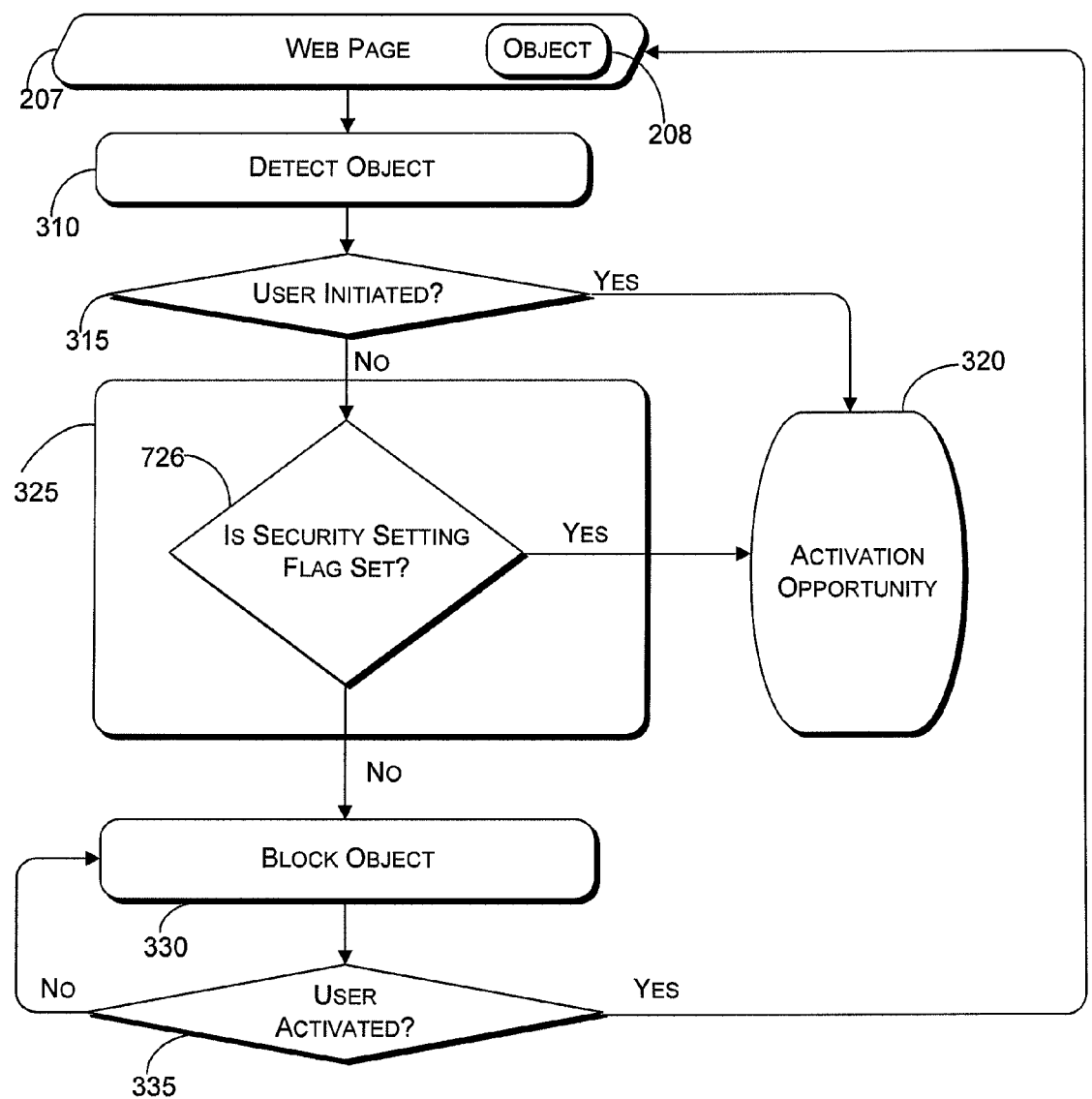
FIG. 7 illustrates another processing flow further to the example of FIG. 3.

FIG. 7 describes an example in which a trust level analysis is performed on a navigation object that may exceed the security settings of computing device 105. This example pertains, for example, to detected object 208 containing a URL linking the browser to another web page.

If it is determined that the internet or intranet security settings for the browser on computing device 105 permits access to the URL of object 208, activation opportunity 320 may include automatically opening the web page linked by object 208 on the browser. Alternative embodiments may display a modal prompt to provide a user with an opportunity to interactively accept or decline the opportunity to open the web page linked by object 208, or display a modeless prompt to advise the user of the impending opening of the web page.

Trust analysis 325 is performed on object 208 that is optionally determined 315 to not be user-initiated. A determination 726 is made as to whether the security settings of the browser permit the opening of the web page linked by object 208. For example, the determination may include assessing whether the web page linked by object 208 is associated with an intranet for which the browser of computing device 105 is authorized, or is associated with a web page on The Internet that is permitted by a firewall for network 110. A determination 726 is made as to whether a security setting flag is set. The security setting flag may have been set based on a previous activation opportunity. A positive determination results in activation opportunity 320 for object 208.

If an assessment of object 208 determines that the security settings do not permit the web page to be opened, the action is suppressed. The browser then displays a modeless prompt to inform the user that the web page linked by object 208 has been suppressed. Continued interaction with the modeless prompt by the user may result in an opportunity for the user to gather details for object 208 and the suppressed action, which may lead to a further opportunity to interactively accept or decline the opening of the web page linked by object 208.

If the user does interactively accept 335 the opportunity to open the web page linked by object 208, web page 207 is reloaded, or refreshed, which also opens the web page linked by object 208. However, if the user interactively declines the opportunity to render object 208, object 208 remains blocked. The user's browsing experience on web page 207 continues, but without opening the web page linked by object 208.

Figure 8A:
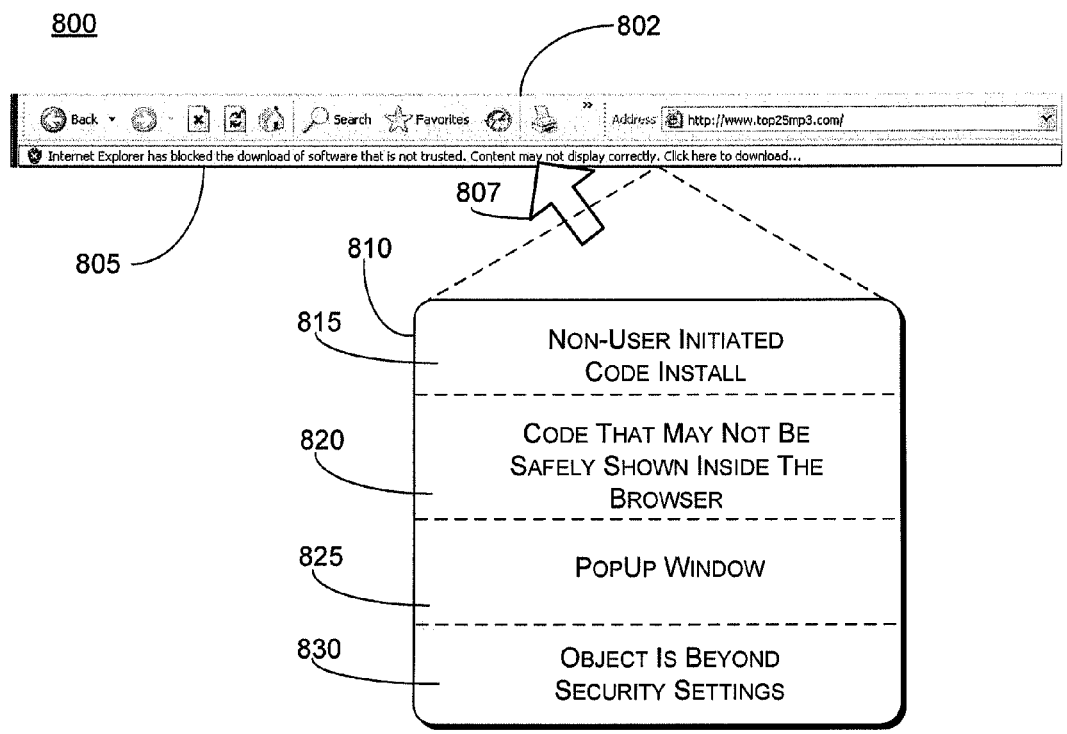
FIG. 8A illustrates an example of a modeless prompt user interface provided in correspondence with the example embodiments of object-related trust decisions.

FIG. 8A shows an example embodiment of a user interface 800 described with reference to the example embodiments of FIGS. 1-7. In particular, user interface 800 includes browser toolbar 802 and modeless prompt 805, which may be displayed for activation opportunity 320 or block object 320 described with regard to FIGS. 3-7. In such instances, modeless prompt 805 is displayed to advise a user that an object-related action is being suppressed, and to further provide the user with an opportunity to interactively accept or decline activation of the suppressed object-related action.

More specifically, toolbar 802 is displayed as part of a browser such as the Microsoft® Internet Explorer, which may be used for browsing the internet or an intranet on computing device 105. In connection with the processing flows of FIGS. 3-7, modeless prompt 805 includes a text field to provide a user with an advisory that an action for object 208 is suppressed. To capture the user's attention, the text field of modeless prompt 205 may displace web page 207 as opposed to being displayed on top of a portion of the web page. Furthermore, the text in modeless prompt 805 may wrap to two lines, and ellipses may be provided to indicate if some content is missing. Thus, as shown in the example FIG. 8A, which relates to the Microsoft® Internet Explorer, the text in modeless prompt 805 states: "Internet Explorer has blocked the download of software that is not trusted. Content may not display correctly. Click here to download . . . " Such embodiment is provided merely as an example, however, and is not intended to be limiting.

Example embodiments of modeless prompt 805 may also provide a user with an interactive opportunity to investigate details of object 208, the action of which has been suppressed as described above. For instance, as cursor 807 hovers over a portion of modeless prompt 805, which may or may not require the user to activate the pointer, menu 810 may be displayed to inform the user of characteristics of any object 208, for which an action has been suppressed. As an example, menu 810 lists the characteristics of object 208 in FIGS. 4-7 above, though such embodiment is provided only as an example. In FIG. 8A, menu 810 indicates an action for the following objects to be suppressed: non-user initiated code install 815, code that may not be safely shown inside the browser 820, popup window 825, and object is beyond security settings 830. However, alternative embodiments of menu 810 may include only one of items 815, 820, 825, and 830. That is, such alternative embodiments may display a menu item related to the most recently blocked object 208.

Example embodiments of modeless prompt 805, in particular menu 810, may provide a user with a further opportunity to interactively accept or decline activation of the action for object 208. In particular, as cursor 807 hovers over a selected object in menu 810, which may or may not require the user to activate the pointer, a modal prompt may be displayed. Thus, a user is provided with an opportunity to interactively accept or decline activation of the action for object 208 corresponding to the description over which cursor 807 is hovering.

Figure 8B:
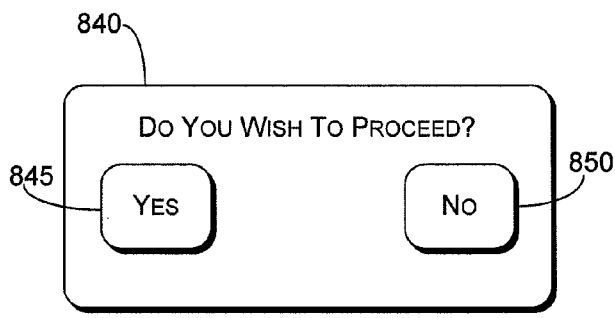
FIG. 8B illustrates an example of a modal prompt user interface provided in correspondence with the example embodiments of object-related trust decisions.

FIG. 8B shows an example of a modal prompt 840 described with reference to the example embodiments of FIGS. 1-8A. In particular, modal prompt 840 may be displayed for activation opportunity 320 or block object 320 described with regard to FIGS. 3-7 or as the further opportunity to interactively accept or decline activation of objection 208 described with regard to FIG. 8A. In such instances, modal prompt 840 is displayed to request the user's interactive selection to accept 845 or decline 850 activation of the suppressed object-related action.

Figure 8C:
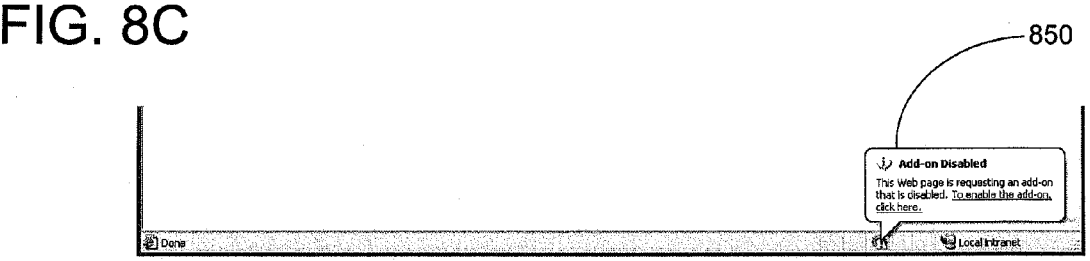
FIG. 8C illustrates an example of another modeless prompt user interface provided in correspondence with further example embodiments of object-related trust decisions.

FIG. 8C shows an example of a modeless prompt 850 described with reference to the example embodiments of FIGS. 1-7, particularly FIG. 4. Modeless prompt 850 may be displayed if object 208 is determined to be explicitly untrusted, or if a certificate corresponding to object 208 has been previously blocked by a user or is simply not present. In such case, modeless prompt 850 may advise the user that an action for an untrusted object has been suppressed, but further provides the user with an opportunity to interactively accept or decline activation of the suppressed object-related action.

Figure 9:
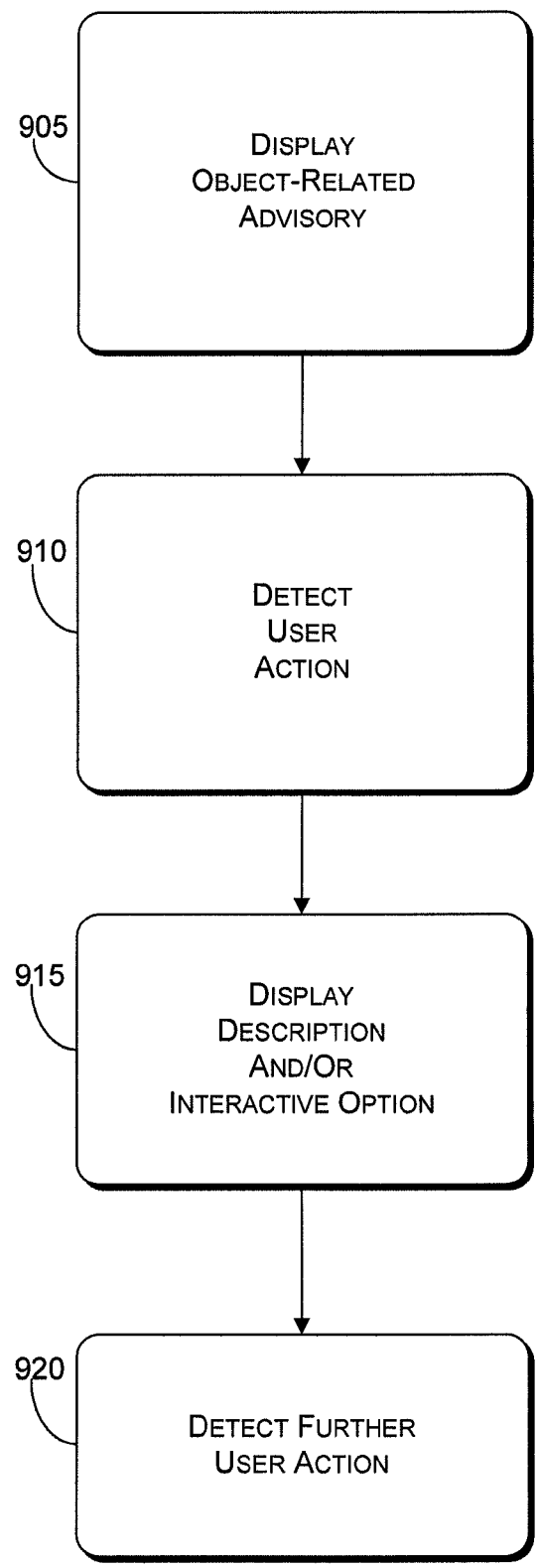
FIG. 9 illustrates an example processing flow with regard to the user interface of FIG. 8.

FIG. 9 illustrates an example processing flow with regard to the user interface of FIG. 8A.

In connection with the example embodiments of FIGS. 3-8A, modeless prompt 805 is displayed 905 as a text field to advise a user that an action for object 208 is suppressed.

A user action is detected 910 as modeless prompt 805 is activated, which may or may not require the user activating the pointer by clicking a mouse, for example. The display 915 of menu 810 provides a description of object 208 for which an action has been suppressed. Further user interaction with the modeless prompt may result in the display of modal prompt 840. For example, as menu 810 is displayed and cursor 807 hovers over a selected object in menu 810, which may or may not require the user to activate the pointer, a modal prompt may be displayed, modal prompt 840 may be displayed to provide a user with an opportunity to interactively accept or decline activation of the action for object 208. Even further user interaction is detected 920 in connection with modal prompt 840 to interactively accept or decline the activation of the action for object 208.

Figure 10:
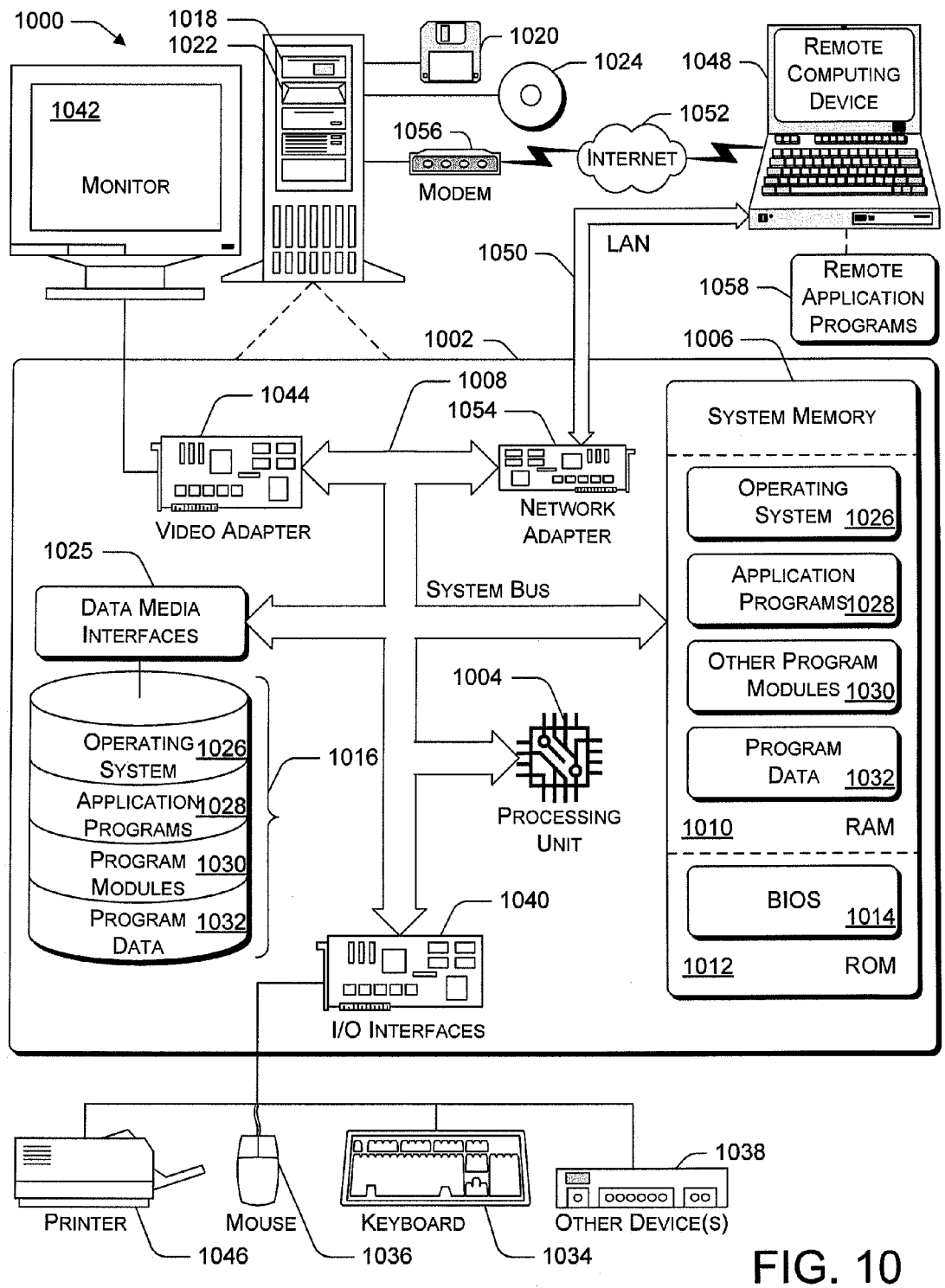
FIG. 10 illustrates an example of a general computer network environment which can be used to implement the techniques described herein.

FIG. 10 illustrates a general computer environment 1000, which can be used to implement the techniques described herein. The computer environment 1000 is only one example of a computing environment and is not intended to suggest any limitation as to the scope of use or functionality of the computer and network architectures. Neither should the computer environment 1000 be interpreted as having any dependency or requirement relating to any one or combination of components illustrated in the example computer environment 1000.

Computer environment 1000 includes a general-purpose computing device in the form of a computer 1002, which may include computing device 105 described with regard to the embodiments described above. The components of computer 1002 can include, but are not limited to, one or more processors or processing units 1004, system memory 1006, and system bus 1008 that couples various system components including processor 1004 to system memory 1006.

System bus 1008 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394, i.e., FireWire, bus.

Computer 1002 may include a variety of computer readable media. Such media can be any available media that is accessible by computer 1002 and includes both volatile and non-volatile media, removable and non-removable media.

System memory 1006 includes computer readable media in the form of volatile memory, such as random access memory (RAM) 1010; and/or non-volatile memory, such as read only memory (ROM) 1012 or flash RAM. Basic input/output system (BIOS) 1014, containing the basic routines that help to transfer information between elements within computer 1002, such as during start-up, is stored in ROM 1012 or flash RAM. RAM 1010 typically contains data and/or program modules that are immediately accessible to and/or presently operated on by processing unit 1004.

Computer 1002 may also include other removable/non-removable, volatile/non-volatile computer storage media. By way of example, FIG. 10 illustrates hard disk drive 1016 for reading from and writing to a non-removable, non-volatile magnetic media (not shown), magnetic disk drive 1018 for reading from and writing to removable, non-volatile magnetic disk 1020 (e.g., a "floppy disk"), and optical disk drive 1022 for reading from and/or writing to a removable, non-volatile optical disk 1024 such as a CD-ROM, DVD-ROM, or other optical media. Hard disk drive 1016, magnetic disk drive 1018, and optical disk drive 1022 are each connected to system bus 1008 by one or more data media interfaces 1025. Alternatively, hard disk drive 1016, magnetic disk drive 1018, and optical disk drive 1022 can be connected to the system bus 1008 by one or more interfaces (not shown).

The disk drives and their associated computer-readable media provide non-volatile storage of computer readable instructions, data structures, program modules, and other data for computer 1002. Although the example illustrates a hard disk 1016, removable magnetic disk 1020, and removable optical disk 1024, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 1016, magnetic disk 1020, optical disk 1024, ROM 1012, and/or RAM 1010, including by way of example, operating system 1026, one or more application programs 1028, other program modules 1030, and program data 1032. Each of such operating system 1026, one or more application programs 1028, other program modules 1030, and program data 1032 (or some combination thereof) may implement all or part of the resident components that support the distributed file system.

A user can enter commands and information into computer 1002 via input devices such as keyboard 1034 and a pointing device 1036 (e.g., a "mouse"). Other input devices 1038 (not shown specifically) may include a microphone, joystick, game pad, satellite dish, serial port, scanner, and/or the like. These and other input devices are connected to processing unit 1004 via input/output interfaces 1040 that are coupled to system bus 1008, but may be connected by other interface and bus structures, such as a parallel port, game port, or a universal serial bus (USB).

Monitor 1042 or other type of display device can also be connected to the system bus 1008 via an interface, such as video adapter 1044. In addition to monitor 1042, other output peripheral devices can include components such as speakers (not shown) and printer 1046 which can be connected to computer 1002 via I/O interfaces 1040.

Computer 1002 can operate in a networked environment using logical connections to one or more remote computers, such as remote computing device 1048. By way of example, remote computing device 1048 can be a PC, portable computer, a server, a router, a network computer, a peer device or other common network node, and the like. Remote computing device 1048 is illustrated as a portable computer that can include many or all of the elements and features described herein relative to computer 1002. Alternatively, computer 1002 can operate in a non-networked environment as well.

Logical connections between computer 1002 and remote computer 1048 are depicted as a local area network (LAN)

1050 and a general wide area network (WAN) 1052. Such networking environments are commonplace in offices, enterprise-wide computer networks, intranets, and the Internet.

When implemented in a LAN networking environment, computer 1002 is connected to local network 1050 via network interface or adapter 1054. When implemented in a WAN networking environment, computer 1002 typically includes modem 1056 or other means for establishing communications over wide network 1052. Modem 1056, which can be internal or external to computer 1002, can be connected to system bus 1008 via I/O interfaces 1040 or other appropriate mechanisms. It is to be appreciated that the illustrated network connections are examples and that other means of establishing at least one communication link between computers 1002 and 1048 can be employed.

In a networked environment, such as that illustrated with computing environment 1000, program modules depicted relative to computer 1002, or portions thereof, may be stored in a remote memory storage device. By way of example, remote application programs 1058 reside on a memory device of remote computer 1048. For purposes of illustration, applications or programs and other executable program components such as the operating system are illustrated herein as discrete blocks, although it is recognized that such programs and components reside at various times in different storage components of computing device 1002, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

We claim:

1. A method comprising:
    detecting an activatable object associated with a web page;
    determining whether the activatable object is from an untrusted source;
    when the activatable object is from the untrusted source, performing operations comprising:
        suppressing the activatable object; and
        displaying a modeless prompt to advise the user of the suppression of the activatable object; and
        providing an opportunity to interactively accept activation of the action associated with the activatable object; and
    when the activatable object is not from the untrusted source, automatically activating the action associated with the activatable object.

2. The method of claim 1, further comprising detecting a first user action, wherein the detection of the first user action comprises detecting a mouse interaction with the modeless prompt.

3. The method of claim 2, wherein the mouse interaction comprises a mouse pointer hovering over the display of the modeless prompt.

4. The method of claim 3, further comprising:
    upon detection of a first user action, displaying a menu of selectable objects; and
    detecting a second user action, wherein the second user action comprises selecting one of the selectable objects.

5. The method of claim 4, wherein the selecting of the one of the selectable objects does not require activation of the mouse pointer.

6. The method of claim 2, wherein activation of the mouse pointer comprises a mouse click.

7. The method of claim 1, wherein the modeless prompt comprises a menu of selectable objects.

8. The method of claim 1, further comprising:
    prior to displaying the modeless prompt, suppressing an object associated with a web page.

9. The method of claim 1, wherein the activatable object is activated by a user action.

10. The method of claim 1, wherein the user action results in displaying a modal prompt.

11. A computer-readable storage medium storing one or more instructions that, when read, cause one or more processors on a client device to execute steps comprising:
    detecting an activatable object associated with a web page;
    determining whether the activatable object is from an untrusted source;
    when the activatable object is from the untrusted source, performing operations comprising:
        suppressing the activatable object; and displaying a modeless prompt to advise the user of the suppression of the activatable object; and providing an opportunity to interactively accept activation of the action associated with the activatable object; and when the activatable object is not from the untrusted source, automatically activating the action associated with the activatable object.

12. The computer-readable storage medium of claim 11, further comprising detecting a first user action, wherein the detection of the first user action comprises detecting a mouse interaction with the modeless prompt.

13. The computer-readable storage medium of claim 12, wherein the mouse interaction comprises a mouse pointer hovering over the display of the modeless prompt.

14. The computer-readable storage medium of claim 13, wherein the method further comprises:

upon detection of a first user action, displaying a menu of selectable objects; and detecting a second user action, wherein the second user action comprises selecting one of the selectable objects.

15. The computer-readable storage medium of claim 14, wherein the selecting of the one of the selectable objects does not require activation of the mouse pointer.

16. The computer-readable storage medium of claim 12, wherein activation of the mouse pointer comprises a mouse click.

17. The computer-readable storage medium of claim 11, wherein the modeless prompt comprises a menu of selectable objects.

18. The computer-readable storage medium of claim 11, wherein the method further comprises:

prior to displaying the modeless prompt, suppressing an object associated with a web page.

19. The method of claim 11, wherein the activatable object is activated by a user action.

20. The method of claim 11, wherein the detecting of the first user action results in displaying a modal prompt.

21. A system comprising:

at least one processor;

a memory coupled to the at least one processor, the memory for storing instructions which, when executed by the at least one processor, performs a method, the method comprising:

detecting an activatable object associated with a web page;

determining whether the activatable object is from an unfrosted source;

when the activatable object is from the untrusted source, performing operations comprising:

suppressing the activatable object and displaying a modeless prompt to advise the user of the suppression of the activatable object; and providing an opportunity to interactively accept activation of the action associated with the activatable object and when the activatable object is not from the untrusted source, automatically activating the action associated with the activatable object.

22. The system of claim 21, further comprising detecting a first user action, wherein the detection of the first user action comprises detecting a mouse interaction with the modeless prompt.

23. The system of claim 22 wherein the mouse interaction comprises a mouse pointer hovering over the display of the modeless prompt.

24. The system of claim 23, wherein the method further comprises:

upon detection of a first user action, displaying a menu of selectable objects, and detecting a second user action, wherein the second user action comprises selecting one of the selectable objects.

25. The system of claim 24, wherein the selecting of the one of the selectable objects does not require activation of the mouse pointer.

26. The system of claim 23, wherein activation of the mouse pointer comprises a mouse click.

27. The system of claim 22, wherein the modeless prompt comprises a menu of selectable objects.

28. The method of claim 21, wherein the activatable object is activated by a user action.

29. The method of claim 21, wherein the detecting of the first user action results in displaying a modal prompt.

* * * * *